Figure 1:
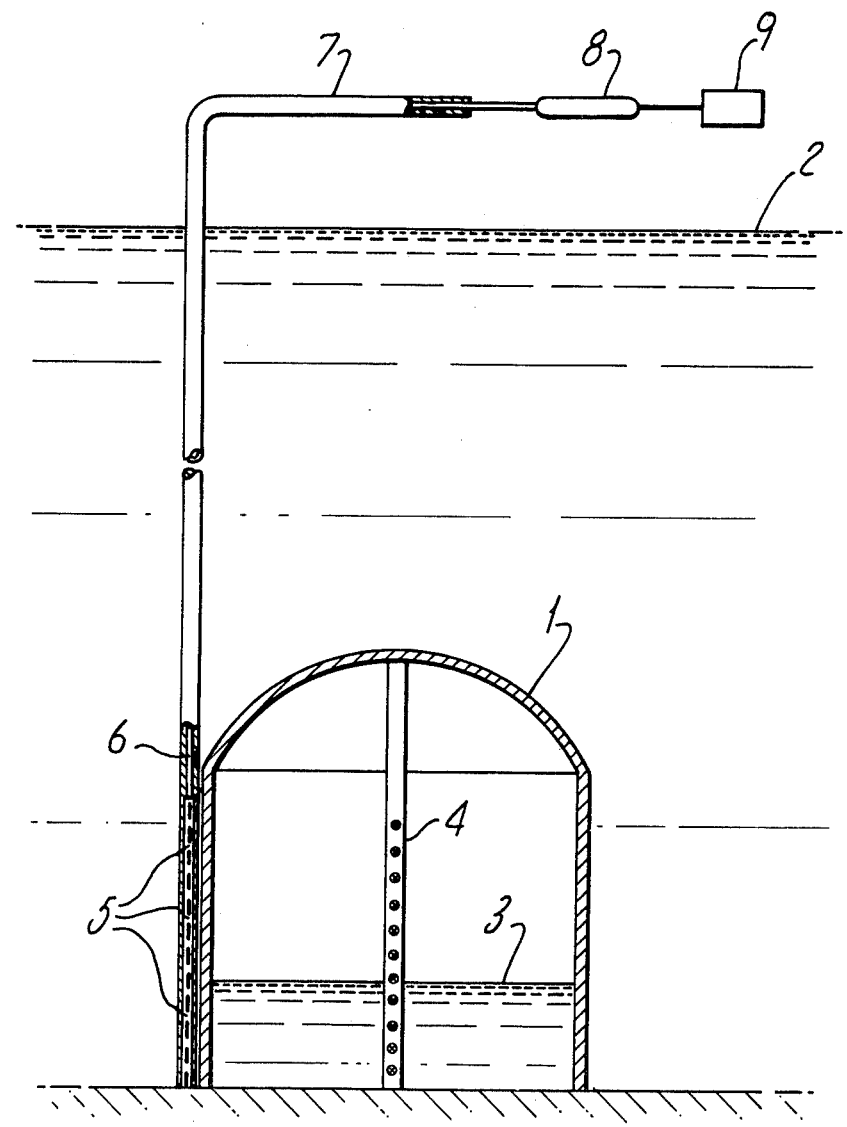

United States Patent [19]

Hurst et al.

[11] Patent Number: 4,471,223
[45] Date of Patent: Sep. 11, 1984

[54] LEVEL AND INTERFACE DETECTION

[75] Inventors: James A. Hurst; David M. Gilhen; Peter Jackson, all of Stockton-On-Tees, England

[73] Assignee: Imperial Chemical Industries PLC, London, England

[21] Appl. No.: 356,508

[22] Filed: Mar. 9, 1982

[30] Foreign Application Priority Data

Mar. 12, 1981 [GB] United Kingdom ................. 8107895

[51] Int. Cl.³ ............................................. G01F 23/00
[52] U.S. Cl. .................................. 250/357.1; 250/368
[58] Field of Search ............... 250/357.1, 368; 378/52; 350/96.15, 96.20

[56] References Cited

U.S. PATENT DOCUMENTS

| | | | |
|---|---|---|---|
| 3,138,709 | 6/1964 | Cassen et al. | 250/368 |
| 3,668,392 | 6/1972 | Bajek et al. | 378/52 |
| 3,794,428 | 2/1974 | Giesecke | 356/440 |
| 4,155,013 | 5/1979 | Spiteri | 250/357.1 |
| 4,267,819 | 5/1981 | Claesson | 350/96.2 |
| 4,292,628 | 9/1981 | Sadler | 350/96.15 |

FOREIGN PATENT DOCUMENTS 1586641 3/1978 United Kingdom .

*Primary Examiner*—Janice A. Howell
*Attorney, Agent, or Firm*—Cushman, Darby & Cushman

[57] ABSTRACT

Method and apparatus to determine the position of a liquid/liquid or liquid/vapor interface in a remote inaccessible location, for example in undersea oil storage tanks, by exposing the liquids or liquid and vapor to gamma-radiation from a source adjacent to or within the vessel containing the liquid(s) and monitoring the gamma-radiation issuing from the liquids or liquid and vapor, and using long lengths of optical fibre to convey the signals received to a measuring instrument. The invention employs optical fibres which may be up to several hundred meters long and among its advantages is the need for no moving parts, electrical supply or electronics at the remote location.

11 Claims, 3 Drawing Figures

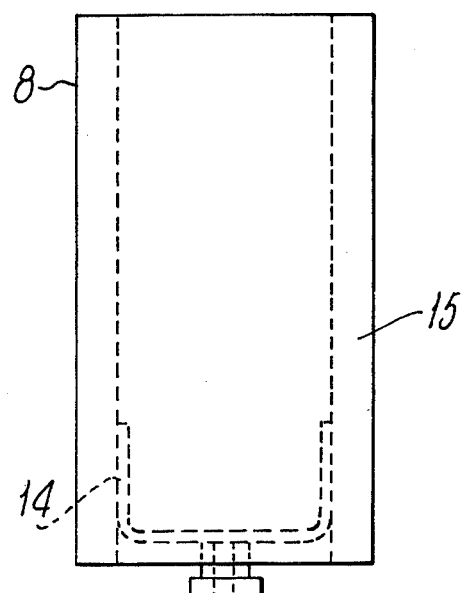
Fig.2.
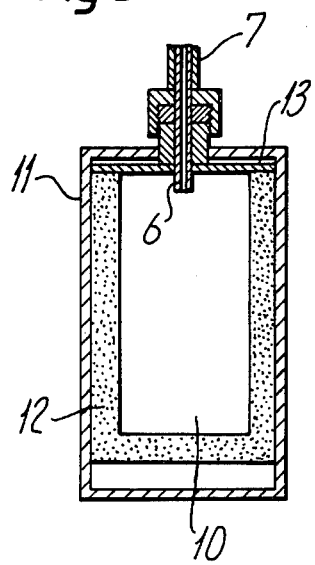
Fig.3.
ACCESSIBLE, SAFE
———+———
REMOTE, HAZARDOUS
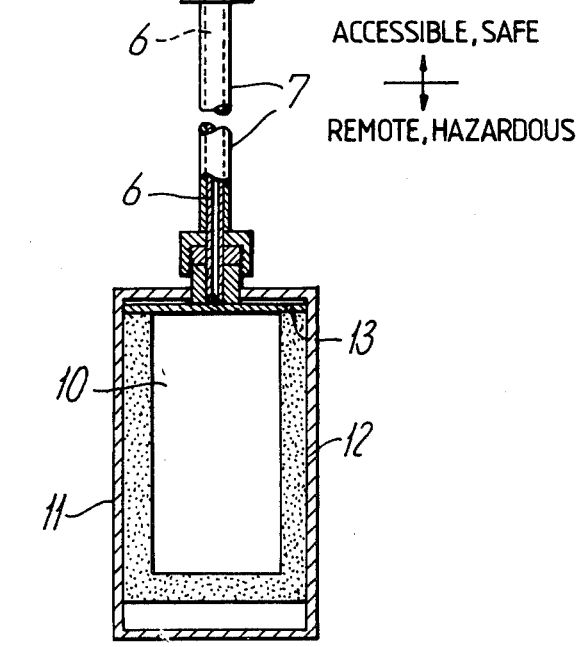

LEVEL AND INTERFACE DETECTION

The present invention relates to an improved method for detecting the interface between two immiscible or partly-miscible fluids.

Liquid-liquid and liquid-vapour interfaces occur frequently in industrial practice, examples being the levels of liquids in separators, storage vessels etc. A number of methods are available for measuring the position of such interfaces and in favourable circumstances these methods work very well. By now, it is a fairly routine and convenient operation to measure the interface in, say, a storage vessel which is readily accessible to the person taking the measurement. However, problems begin to arise in circumstances where the interface is not readily accessible.

One particular current problem involves undersea oil installations including undersea oil storage tanks. The off-shore oil industry uses large undersea storage tanks in which the oil floats on a "piston" of sea water. The tanks are filled by forcing oil under pressure into the top of the tank, thus forcing sea-water out through the bottom of the tank. Oil is removed from the tank by allowing sea-water to enter the bottom of the tank, thus forcing oil out through a valve in the top. In one method, the oil/sea-water interface is monitored by a vertical array of thermal sensors immersed in the liquid. Each sensor measures the thermal conductivity of the liquid which surrounds it, the thermal conductivities of oil and sea-water being significantly different.

United Kingdom Pat. No. 1,586,641 describes a detector for locating the interfacial boundary between two liquids and describes the use of such a detector in the detection of crude petroleum pollution in the vicinity of an underwater wellhead.

One of the problems associated with instruments which are located in remote or inaccessible positions, whether underwater, underground or even at ground level, is that the instruments must be so designed that they are reliable and moreover will retain their reliability without maintenance for long periods, sometimes running into many years. It is inherent in instruments with electronics and/or moving parts that sooner or later it is likely that some part will go wrong and require replacement. Unfortunately, replacement is not possible if the instrument is inaccessible. For example, the method for monitoring an oil/sea-water interface using thermal sensors has proved unreliable because of a build-up of deposits of wax from the oil on the sensors distorting the results. Being several hundred feet below sea-level, cleaning of the sensors is not possible. Thus with the recent expansion in under-water and underground storage of liquids, a need has developed for reliable but relatively simple instruments for use in inaccessible environments.

We have now surprisingly found that it is possible to measure a liquid-liquid or liquid/vapour interface at a remote location using relatively simple, but reliable, instrumentation.

According to the present invention, apparatus for determining the position of a liquid-liquid or liquid-vapour interface comprises at least one source of gamma-rays to emit gamma-rays into the liquids or liquid vapour, a detector system comprising at least one gamma-ray scintillator to detect gamma-rays issuing from the liquids or liquid and vapour, and an optical fibre which is linked to the detector and which is at least 20 meters long to convey the signals from the detector to a measuring instrument.

The source of gamma-rays may be any suitable material but preferred sources are of cesium-137 and cobalt-60.

The detector system preferably comprises an array of gamma-ray scintillators which in use are arranged along the length of the vessel containing the liquid or liquids whose level or interface is being detected. Preferably the gamma-ray scintillators comprise crystals of cesium iodide, sodium iodide, or plastic scintillators for example scintillating fibres.

Hitherto, it has been thought that the use of optical fibres in scintillation instruments must be limited to situations in which only very short lengths of optical fibre, say up to 2 meters, are required. We have found that it is possible to carry a signal from a gamma-ray scintillator along much greater lengths of optical fibre for example along a length of a few hundred meters. In preferred embodiments of the invention in which undersea measurements are made, the optical fibre is commonly at least 50 meters long and frequently at least 100 meters long.

The present invention also includes a method for determining the position of the interface between two liquids or a liquid and a vapour in a vessel located in a remote position which comprises exposing the liquids or the liquid and vapour to gamma-radiation emitted from a source adjacent to or within the vessel, monitoring the gamma-radiation issuing from the liquids or the liquid and vapour using a gamma-ray scintillator and transmitting the signal from said scintillator along a length of at least 20 meters of optical fibre to a measuring instrument.

Some care needs to be taken in applying the method and apparatus of the present invention. In preferred embodiments of the invention, some parts of the apparatus used are located at considerable distances, for example at least 100 meters, from the measuring instrument (and the operator) and this remoteness causes certain problems. Hitherto, for example, optical fibers have been used over very short distances, for example in nuclear reactor cores, and so relatively large diameter light pipes with high collection efficiency and low transmission efficiency could be used. However, in operation of the present invention it is necessary to use fibres with low loss transmission properties and these fibres, therefore, are necessarily of small diameter. Consequently the collection of light from the scintillator is inefficient and this means that a very sensitive photo detector is required to see the small proportion of the scintillations which are transmitted. However the very sensitivity of the detector requires certain precautions in its use. Where, for example, a photo-multiplier tube is used as part of the detector, the detector must be kept cool in order to reduce the noise introduced by thermal electrons emitted from the photo-cathode and the fibre cable must be shielded in addition to its normal sheathing in order to prevent light leaking into the cable and hence into the detector. The amplitude of the signals from the photon detector is of the same order as that of the noise from the detector itself and so signal processing to improve the signal to noise ratio is not possible.

The Applicants have found that fibres having diameters of 400 $\mu$m and 600 $\mu$m are suitable for use in the method and apparatus of this invention in that such fibres have acceptable light collection efficiency and light transmission properties and, moreover, are not too expensive. However, the use of fibres of less than 400 μm or greater than 600 μm diameter is not ruled out provided that such fibres meet the criteria set out above.

Care also has to be taken in the choice of various components of the system. For example, those skilled in this art will know that the wavelengths transmitted by cesium iodide fall mainly in the green band of the spectrum, that the optical fibre's most efficient wavelength is in the red band of the spectrum and that photomultiplier detectors are most sensitive in the blue band of the spectrum. Thus the choice of these components must be so made that their most sensitive wavelengths overlap as far as possible.

If desired, a number of fibres from a number of scintillators can be coupled into one measuring instrument, for example a photomultiplier tube.

The method and apparatus of the present invention have the inherent advantages over other proposals for remote measurement of liquid-liquid and liquid-vapour interfaces that there are no moving parts involved, no electrical supplies to the remote detector or electronics needed at the remote location, accuracy of measurement, reliability and intrinsic safety at the remote location.

One embodiment of the present invention is hereinafter described in greater detail with reference to the accompanying drawings in which FIG. 1 is a schematic representation of the invention in use in undersea location FIG. 2 is a schematic representation illustrating the general arrangement of the fibre optic scintillation detector used in FIG. 1, and FIG. 3 is a schematic representation of an alternative arrangement for the connection of optical fibre to gamma-ray scintillating crystal.

Referring to FIG. 1, an oil storage tank 1 is located on the sea bed at some distance below sea level 2. Oil is stored in the upper half of the tank and is supported on sea-water, the oil-water interface being indicated by the line 3. (For convenience, inlets and outlets in the tank for oil and water have been omitted from the drawing). Within the tank 1 is stationarily located a series of gamma-ray emitters 4, for example cesium 137, and stationarily located opposite to the emitters, externally of the tank, is a series of gamma-ray scintillators 5, for example cesium iodide. (If desired, the emitters 4 and scintillators 5 may be located either within or outside tank 1). Each scintillator 5 is provided with at least one optical fibre 6 (of which, for convenience only one is shown) to convey the scintillator signal to a measuring station above sea level. The optical fibres are housed in a protective sheath 7 and at the surface the scintillator signals are passed through a photomultiplier 8 to a suitable indicator 9 which provides an indication of the position of the oil-water interface.

As the oil-water interface moves within the tank so the signals received from scintillators 5 vary thereby providing a ready means of identifying the exact position of the interface.

Referring to FIG. 2, the scintillator detector 5 is shown in more detail. A cesium iodide crystal 10 is housed within a steel or "Inconel" case 11, a suitable dessicant 12 filling the volume between the outer surface of crystal 10 and inner wall of case 11. The upper portion of crystal 10 is covered with a glass window 13 through which the scintillations of the iodide crystal pass into the optical fibre 6 which is butted up to the window 13. The scintillations eventually pass into the photomultiplier tube 14 of the detector 8. The tube 14 is surrounded with a cooling water jacket 15.

FIG. 3 illustrates a modification to the scintillator detector which is designed to increase the collection of light from the crystal 10. In this modification the optical fibre 6 is taken through the glass window and cemented on to the crystal itself. In this way light lost by reflections is reduced and the strength of the signal reaching the photomultiplier 8 is increased. In this modification, the glass window 13 is not strictly necessary although if it is omitted a lid of some sort is required to take its place.

We claim:

1. Apparatus for determining the position of a liquid-liquid or liquid-vapour interface of a body of liquids or liquid and vapour having such an interface, comprising:

at least one stationarily located source of gamma-rays constructed and adapted to be arranged, when in use, for emitting gamma-rays into the liquids or liquid and vapour;

a detector system comprising at least one stationarily located gamma-ray scintillator constructed and adapted to be arranged, when in use, as a detector for detecting gamma-rays issuing from the liquids or liquid and vapour; and for each such detector, an optical fibre which is operatively linked to that detector and which is at least 20 meters long for conveying the signals from each respective said detector to a measuring instrument.

2. Apparatus as claimed in claim 1 in which the source of gamma-rays is cesium-137 of cobalt-60.

3. Apparatus as claimed in claim 1 in which the detector system comprises an array of a plurality of stationarily located gamma-ray scintillators similar to and including said at least one gamma-ray scintillator and adapted to be arranged, when in use, along the length of the vessel containing the liquid or liquids whose level or interface is being detected.

4. Apparatus as claimed in claim 1 in which the at least one gamma-ray scintillator is selected from crystals of cesium iodide, crystals of sodium iodide and plastic scintillators.

5. Apparatus as claimed in claim 1 in which the detector system includes at least one photo-multiplier tube linked by the optical fibre to the at least one gamma-ray scintillator.

6. Apparatus as claimed in claim 3 in which the optical fibres linked to a plurality of scintillators are coupled into a single measuring instrument.

7. Apparatus as claimed in claim 6, wherein:

the diameter of the optical fibre for each said detector is in the range of 400 to 600 μm; and said apparatus further includes an underwater oil storage tank constructed and arranged, when in use, to contain said body of liquids or liquid and vapor having said interface.

8. Apparatus as claimed in claim 1 in which the length of optical fibre linking the detector system to a measuring instrument is at least 50 meters.

9. Apparatus as claimed in claim 1 in which the diameter of the optical fibre for each said detector is in the range 400 to 600 μm.

10. A method for determining the position of the interface between two liquids or a liquid and a vapour in a vessel located in a remote position which comprises exposing the liquids or the liquid and vapour to gamma-radiation emitted from a fixed source adjacent to or within the vessel, monitoring the gamma-radiation issuing from the liquids or the liquid and vapour using a stationarily located gamma-ray scintillator and transmitting the signal from said scintillator along a length of at least 20 meters of optical fibre to a measuring instrument.

11. A method as claimed in claim 10 in which the signal from the scintillator is tramsmitted along a length of at least 50 meters of optical fibre.

* * * * *